United States Patent
Abousleman et al.

(10) Patent No.: US 7,231,086 B2
(45) Date of Patent: Jun. 12, 2007

(54) KNOWLEDGE-BASED HIERARCHICAL METHOD FOR DETECTING REGIONS OF INTEREST

(75) Inventors: Glen P. Abousleman, Scottsdale, AZ (US); Huibao Lin, Tempe, AZ (US); Jennie Si, Phoenix, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 599 days.

(21) Appl. No.: 10/142,175

(22) Filed: May 9, 2002

(65) Prior Publication Data

US 2003/0210818 A1   Nov. 13, 2003

(51) Int. Cl.
G06K 9/48   (2006.01)
(52) U.S. Cl. .................................................... 382/199
(58) Field of Classification Search ................ 382/305, 382/199
See application file for complete search history.

(56) References Cited

U.S. PATENT DOCUMENTS

| | | | | |
|---|---|---|---|---|
| 5,887,081 | A * | 3/1999 | Bantum | 382/173 |
| 6,614,928 | B1 * | 9/2003 | Chung et al. | 382/154 |
| 6,678,404 | B1 * | 1/2004 | Lee et al. | 382/155 |
| 6,801,665 | B1 * | 10/2004 | Atsumi et al. | 382/239 |
| 6,804,403 | B1 * | 10/2004 | Wang et al. | 382/240 |
| 6,816,627 | B2 * | 11/2004 | Ockman | 382/284 |
| 2003/0161523 | A1 * | 8/2003 | Moon et al. | 382/139 |

OTHER PUBLICATIONS

Marshall, David, "Edge Detection," http://www.cs.cf.ac.uk/Dave/Vision_lecture/node24.html, 1997.*

H. Lin, J. Si, and G. Abousleman, "Knowledge-Based Hierarchical Region-of-Interest Detection," Proc. IEEE Int'l Conf. Accoustics, Speech and Signal Processing, vol. 4, pp. 3628-3631, Orlando, Florida, May 13-17, 2002.

T.M. Stough and C.E. Brodley, "Focusing Attention on Objects of Interest Using Multiple Matched Filters," IEEE Trans. Image Processing, vol. 10, No. 3, pp. 419-426, Mar. 2001.

A. Mohan, C. Papageorgiou, and T. Poggio, "Example-Based Object Detection in Images by Components," IEEE Trans. Pattern Analysis and Machine Intelligence, vol. 23, No. 4, pp. 349-361, Apr. 2001.

C.M. Privitera and L.W. Stark, "Algorithms for Defining Visual Regions-of-Interest: Comparison with Eye Fixations," IEEE Trans. Pattern Analysis and Machine Intelligence, vol. 22, No. 9, pp. 970-982, Sep. 2000.

(Continued)

*Primary Examiner*—Joseph Mancuso
*Assistant Examiner*—Jonathan Schaffer
(74) *Attorney, Agent, or Firm*—Jenner & Block LLP

(57) ABSTRACT

A knowledge-based hierarchical method for detecting regions of interests (ROIs) uses prior knowledge of the targets and the image resolution in detecting ROIs. The result produces ROIs that contain only one target that is completely enclosed within the ROI. The detected ROI can conform to the shape of the target even if the target is of irregular shape. Furthermore, the method works well with images that contain connected targets or targets broken into pieces. The method is not sensitive to contrast levels and is robust to noise. Thus, this method effectively detects ROIs in common real world imagery that has a low resolution without costly processing while providing fast and robust results.

25 Claims, 17 Drawing Sheets

OTHER PUBLICATIONS

T. Zhang, J. Peng, and Z. Li, "An Adpative Image Segmentation Method with Visual Nonlinearity Characteristics," IEEE Trans. on Systems, Man, and Cybernetics—Part B: Cybernetics, vol. 26, No. 4, pp. 619-627, Aug. 1996.

N.R. pal, T.C. Cahoon, J.C. Bezdek, and K. Pal, "A New Approach to Target Recognition for LADAR Data," IEEE Trans. Fuzzy Systems, vol. 9, No. 1, pp. 44-52, Feb. 2001.

E. Pietka, A. Gertych, S. Pospiech, F. Cao, and H.K. Huang, "Computer-Assisted Bone Age Assessment: Image Preprocessing and Epiphyseal/Metaphyseal ROI Extraction," IEEE Trans. Image Processing, vol. 20, No. 8, pp. 715-729, Aug. 2001.

E. Pietka, L. Kaabi, M.L. Kuo, and H.K. Huang, "Feature Extraction in Carpal-Bone Analysis," IEEE Trans. Medical Imaging, vol. 12, No. 1, pp. 44-49, Mar. 1993.

B. Sahiner, H.-P. Chan, N. Petrick, D. Wei, M.A. Helvie, D.D. Adler, and M.M. Goodsitt, "Classification of Mass and Normal Breast Tissue: A Convolution Neural Network Classifier with Spatial Domain and Texture Images," IEEE Trans. Medical Imaging, vol. 15, No. 5, pp. 598-610, Oct. 1996.

E. Klotz, W.A. Kalender, and T. Sandor, "Automated Definition and Evaluation of Anatomical ROI's for Bone Mineral Determination by QCT," IEEE Trans. Medical Imaging, vol. 8, No. 4, pp. 371-376, Dec. 1989.

J.K. Kim and H.W. Park, "Statistical Textural Features for Detection of Microcalcifications in Digitized Mammograms," IEEE Trans. Medical Imaging, vol. 18, No. 3, pp. 231-238, Mar. 1999.

E.V.R.D. Bella, G.T. Gullberg, A.B. Barclay, and R.L. Eisner, "Automated Region Selection for Analysis of Dynamic Cardiac SPECT Data," IEEE Trans. Nuclear Science, vol. 44, No. 3, pp. 1355-1361, Jun. 1997.

J.L. Solka, D.J. Marchette, B.C. Wallet, V.L. Irwin, and G.W. Rogers, "Identification of Man-Made Regions in Unmanned Aerial Vehicle Imagery and Videos," IEEE Trans. Pattern Analysis and Machine Intelligence, vol. 20, No. 8, pp. 852-857, Aug. 1998.

J. Li, J.Z. Wang, R.M. Gray, and G. Wiederhold, "Multiresolution Object-of-Interest Detection for Images with Low Depth of Field," Proc. Int'l Conf. Image Analysis and Processing, pp. 32-37, Venice, Italy, 1999.

M.N. Gurcan, Y. Yardimci, A.E. Cetin, and R. Ansari, "Detection of Microcalcifications in Mammograms Using Higher Order Statistics," IEEE Signal Processing Letters, vol. 4, No. 8, pp. 213-216, Aug. 1997.

Christoyianni, E. Dermatas, and G. Kokkinakis, "Automatic Detection of Abnormal Tissue in Mammography," Proc. 2001 IEEE Intl. Conf. on Image Processing, vol. 2, pp. 877-880, Thessaloniki, Greece, 2001.

W.E. Polakowski, D.A. Cournoyer, S.K. Rogers, M.P. DeSimio, D.W. Ruck, J.W. Hoffmeister, and R.A. Raines, "Computer-Aided Breast Cancer Detection and Diagnosis of Masses Using Difference of Gaussians and Derivative-Based Feature Saliency," IEEE Trans. Medical Imaging, vol. 16, No. 6, pp. 811-819, Dec. 1997.

Jouan, J. Verdenet, J.C. Cardot, M. Baud, and J. Duvernoy, "Automated Detection of the Left Ventricular Region of Interest by Means of the Extraction of Typical Behaviors in Cardiac Radionuclide Angiographies," IEEE Trans. Medical Imaging, vol. 9, No. 1, pp. 5-10, Mar. 1990.

M. Antonini, M. Barlaud, P. Mathieu, and I. Daubechies, "Image Coding Using Wavelet Transform," IEEE Trans. Image Processing, vol. 1, No. 2, pp. 205-220, Apr. 1992.

\* cited by examiner

Line style
- ⟹ : Data
- → : Knowledge

Operations
  (1) Knowledge Processing
  (2) Image down-sampling by wavelet
  (3) ROC detection for each prototype group
  (4) ROC voting
  (5) ROC area extension for ROI (a) Before splitting      (b) After splitting (a) $S_{rec}$ and $S_{pad}$ for a region　　　(b) Membership function in one line (a) Two ROCs     (b) Membership shown in 3-D space     (c) ROIs detected by HROID The original image The gradient The edges detected Split for group 1

Merge for group 1

ROC for group 1

Merge for group 2

ROC for group 2

Voting

Region of Interest

KNOWLEDGE-BASED HIERARCHICAL METHOD FOR DETECTING REGIONS OF INTEREST

BACKGROUND OF THE INVENTION

1. Field of the Invention

The present invention relates to the field of image processing and, more particularly, to detecting regions of interests (ROIs) in images.

2. Description of the Related Art

Detecting ROIs in images is a common step in many image processing systems. Conventional digital image recognition systems (DIRSs) detect ROIs by typically using some knowledge of a prototype. Generally, an image is composed of many objects that can be defined by pixels. A group of pixels is called a region. A target is an object of interest. A prototype contains information about a type of target. A DIRS may detect a region in an image that matches the prototype.

Images may contain a lot of information. DIRSs may have different phases to more efficiently process information from an image, such as: a segmentation phase, a feature extraction phase and a classification phase. The function of the segmentation and feature extraction phases are to reduce the volume of data. In the feature extraction phase, some of the significant characteristics of each target are measured and taken together to form a vector. Thus, the image can be converted into a series of targets, each described by a vector. In the segmentation phase, each target is found and is isolated from the rest of the information in the image. The segmentation phase identifies the features to differentiate different prototypes, uses the detection algorithm to group pixels with similar features, and uses a merging algorithm to group regions of the image. Because these issues may impact the efficiency and effectiveness of a DIRS, the segmentation phase can affect the functionality of the entire process.

The algorithms used in the segmentation phase are typically applied to an entire image to reduce the data dimension for subsequent processing purposes. Pixels with similar optical characteristics, such as color and intensity, are grouped together and separated from the others. Particular regions can then be chosen based upon features such as size and shape, and forwarded to successive processing units.

Several problems hinder the segmentation process. First, because of the characteristics of the image, such as luminance, noise level, ROI position uncertainty, etc., it is difficult to determine the critical parameters for segmentation at different positions. Secondly, different objects in the image have different and distinctive features. Even when the pixels of the objects are accurately grouped and separated, other problems remain. For example, several objects may overlap one other, or one object may be broken into pieces and therefore, different regions may correspond to the same object.

Sophisticated algorithms have been proposed to address some of these segmentation issues. However, the computational complexity associated with these algorithms may prohibit them from use in real-time applications. One solution is to quickly detect regions that may correspond to objects, and then apply dedicated algorithms to those regions. Another solution is to first transform the image, and then cluster the image to detect the ROIs. Yet another solution is to first threshold the image, and then take every "blob" as one region.

All of these algorithms detect ROIs by grouping pixels with similar features. However, because the objects may be connected or broken, and portions of an object may be very close to the background, a ROI may correspond to several objects, or a portion of an object. These conventional solutions for segmentation focus on detecting regions of similar optical characteristics, each of which may be only part of one object, or a concatenation of several objects. Thus, these solutions may result in inaccurate, incomplete, or too general results in detecting ROIs. In addition, they are often computationally complex and usually do not work well with low quality images. Thus, there is a need for a method to detect ROIs that is more accurate, efficient, and faster than conventional methods.

SUMMARY OF THE INVENTION

The present invention is a knowledge-based multi-resolution method for detecting ROIs in images. The present invention makes use of prior knowledge about targets using prototype information which can contain size and shape information about an object as well as object size information calculated from the imaging sensor parameters. Using prior knowledge, the present invention can detect ROIs and then apply segmentation to those ROIs. The present invention reduces the computational complexity of detecting ROIs and can provide quality ROI detection performance with poor-quality imagery. Moreover, the excellent detection performance can greatly improve the performance of subsequent processing techniques such as compression, segmentation, and recognition.

The present invention can comprise four primary steps. First, prior knowledge is used to determine which objects should be detected and at what resolution. Prior knowledge typically consists of information about the general types of targets and information about the sensor which captured the image, in particular, the pixel resolution of the image. Second, for a given resolution, a region of candidacy (ROC) extraction is applied. This extraction includes feature selection, region merging and/or splitting, and using prior knowledge to determine which regions may possibly correspond to the targets. Third, the ROCs are fused from different prototype groups to make consolidated ROCs. Fourth, each consolidated ROC is extended if necessary and is assigned an area in the image to make an ROI.

The present invention has several advantages over conventional methods. The use of prior knowledge in the present invention can be used for grouping prototypes, choosing features and the use of more efficient and simpler algorithms. The present invention also utilizes multi-resolution that allows for detecting groups of prototypes on the minimal resolution in which the prototypes are barely detectable which reduces the volume of data to be processed. The use of multi-resolution with different groups of prototypes reduces the risk of errors made in any one resolution from proliferating to other resolutions. The present invention solves many of the problems of conventional methods because of its use of prior knowledge and multi-resolutions. Furthermore, the present invention is not bound to detecting ROIs by symmetrical shapes like rectangles. The present invention may detect ROIs with irregular shapes (i.e. any shape and any positioning) that conform to the shape of the target.

DETAILED DESCRIPTION OF THE PREFERRED EMBODIMENT

Figure 1:
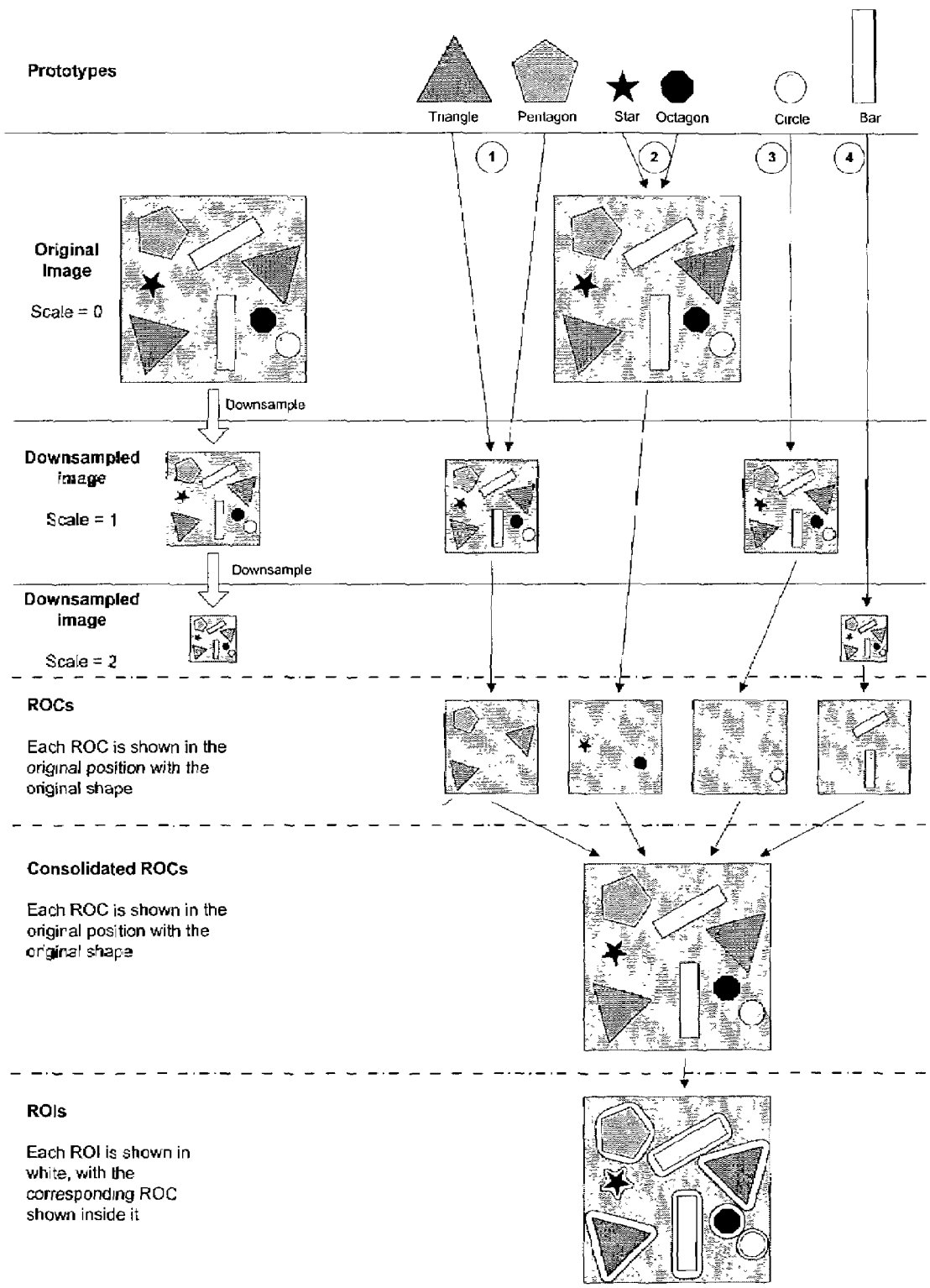
FIG. 1 is an example of a method in accordance with the present invention.

The present invention is a knowledge-based hierarchical method for detecting potential ROIs in an image. The present invention may comprise four primary steps: i) processing prior knowledge to divide the prototypes into groups, and to decide how to detect each group of prototypes; ii) detecting ROCs for each group of prototypes in a properly assigned resolution; iii) competing ROCs for different prototype groups to make the consolidated ROCs; and iv) extending the area of the consolidated ROCs to get the regions of interest (ROIs). The first step is preferably run only once for multiple images, if the prototypes are the same for these images. The second step may run several times for each image. Each time focuses on one group of prototypes and on a particular resolution. The third and fourth steps typically run once for each image.

In the preferred embodiment, prior knowledge consists of general information about the targets (i.e. as prototypes) and information about the sensor generating the image. The target is typically a type of object that may be found in the image. The prior knowledge does not need precise information about the target, such as exact dimensions or colors, but general size and shape information should suffice. The present invention allows for the target to be loosely defined. Thus, in the present invention, a user can easily change the type of target of interest by simply modifying the prior knowledge. These prototypes may be further classified into groups with similar optical properties and sizes.

The sensor can be any device for generating, copying, recording, etc. an image such as video camera, a satellite, etc. The prior knowledge typically would know the pixel resolution of the image generated by the sensor. Accordingly, the present invention can determine approximately how many pixels correlates to a specific unit of measurement. For example, because of prior knowledge a system using the present invention would know that in a certain image 15 pixels would equal 10 feet. This allows the present invention to have a reference point when reviewing objects in images of different resolutions.

1. Notation and Definitions

Function D(x) is the definition domain of variable x; function N(X) is the number of elements in set X. A digital image I is defined on a two-dimension digital space and consists of a set of pixels p, i.e., $D(I)=Z^2$, and $I=\{p_i | 1 \leq i \leq N(I)\}$. The underlying grid G of I can be 8-connected or 4-connected, or others.

A region r is a subset of I. It is a connected component if, for any two pixels $p_i, p_j \in r$, there exists a sequence of pixels $\{q_0, q_1, q_2, \ldots, q_M\}$ such that $q_0=p_i$, $q_M=p_j$, and $\forall 1 \leq k \leq M$, $(q_{k-1}, q_k) \in G$.

The input image I, in original resolution, is said to be in scale=0. I can be down-sampled by any of the factors, $2^i$, $i=1, 2, \ldots$. If it is down-sampled by $2^i$, then the size of the resulted image is $(\frac{1}{2}^i)$-times the size of the original image, and the down-sampled image is said to be at scale i.

A prototype, $ptt_i$, $1 \leq i \leq N(ptt)$, denotes a category of objects. For example, for types of military aircrafts, B-52H can be one prototype, and Mig-29 can be another. Additionally, one image may have more than one object derived from the same prototype. Furthermore, in the preferred embodiment, one or more prototypes may be re-arranged to form "groups," $g_i$, $1 \leq i \leq N(g)$. Consequently, $$\bigcup_{i=1}^{N(g)} g_i = ptt \tag{1a}$$

$$g_i \cap g_j = 0, \forall i \neq j. \tag{1b}$$

In the present invention, the task is usually to automatically detect specific objects within an image. Therefore, without loss of generality, the present invention preferably assumes that the shape and size of the prototype, the resolution of the image, and other physical information is available to be used. With the size of the prototypes and the resolution of the image, the present invention can further calculate the size of the targets in the image. For example, a B-52H with physical size of 49 meters×56 meters (length times wingspan), in an image of resolution 0.5 meters/pixel, occupies 98 pixels× 112 pixels in the image. With the size and resolution information, the present invention can derive the size of the prototypes at any down-sampled scale, i.e., $S_i(ptt_j)$, $i=1, 2, \ldots, L, j=1, 2, \ldots, N(ptt)$. The size of the jth prototype at the ith scale satisfies $$S_i(ptt_j) = S_0(ptt_j)/2^i \tag{2}$$

In consideration of orientation invariance, the "size" of a prototype refers to the largest projection that the prototype renders along any direction. To assign a proper resolution to an image that contains a prototype of interest, there is a threshold value associated with each prototype, $ptt_i$, denoted by $S^{exp}(ptt_i)$. Any object should have size (in pixels) no less than this to ensure reasonable detection and recognition.

At scale i, the maximal size of an object in a prototype group, $g_j$, is defined as $$S_i^{max}(g_j) = \max_{k \in g_j} \{S_i(ptt_k)\} \tag{3a}$$

and the minimal size is $$S_i^{min}(g_j) = \min_{k \in g_j} \{S_i(ptt_k)\} \tag{3b}$$

Every object in I is a potential target, $t_i$, $1 \leq i \leq N(t)$. Assume that the targets are not overlapping, but can be touching. Then, $$D(t_i) \subseteq D(I) \tag{4a}$$

$$D(t_i) \cap D(t_j) = 0, \forall i \neq j \tag{4b}$$

The expected outcome of the present invention is a series of ROIs, $roi_i$, $1 \leq i \leq N(roi)$, which satisfy the following constraints:

$$D(roi_i) \subseteq D(I) \tag{5a}$$

$$D(roi_i) \cap D(roi_j) = 0, \forall i \neq j \tag{5b}$$

The objective of the present invention is therefore the following:

$$\forall 1 \leq i \leq N(t), \exists 1 \leq j \leq N(roi), \text{ such that } D(t_i) \subseteq D(roi_j) \quad (6a)$$

If $D(t_i) \subseteq D(roi_j)$, then there is no $k \neq i$, such that $D(t_k) \subseteq D(roi_j)$ \quad (6b)

2. Prototype Grouping and Resolution Assignment

Prior to any processing procedure on image I, the prototypes are preferably first classified into groups, each with similar optical characteristics and size. The prototype groups, $ptt_i$, $1 \leq i \leq N(ptt)$, are defined and specified in Equation (1).

All prototypes in the same group have similar optical characteristics, size and other properties that are usually easy to measure, e.g., compactness. A series of detection algorithms may be used to detect the reproductions of the prototypes in the image. Each detection algorithm can focus on one group of prototypes, e.g., $g_i$, and does not care about any other prototypes, e.g., $p_j \notin g_i$.

The performance of the present invention is typically enhanced over conventional methods that use a big complex detection algorithm focusing on all prototypes, because, i) it is easier to choose dominant features for a subset of prototypes than all prototypes; ii) the number of reproductions corresponding to the prototypes of interest is smaller, and it is easier to determine the features, and iii) each group of prototypes can be detected at its lowest resolution for enhanced computation speed.

Once the grouping is over, for each group of prototypes $g_i$, a detection algorithm is designed. The detection algorithms for different prototype groups can be different. Some or all of the following procedures may be taken to render some of the parameters required for use in the present invention.

i) Optical features: the features can be anything differentiating targets from non-targets, such as color, intensity, texture, edge, etc.

ii) Classifier: the choice of classifier is subject to the available knowledge of the prototypes $g_i$. For example, if plenty of training data is available, artificial neural networks are good choices, while if standard presentations of the prototypes are available, template matching can be used.

iii) Scale of the image for processing: if the size of a reproduction of a prototype is too small, it may be difficult to correctly recognize the target. However, if the size of the reproduction is large, computation load is heavy. Because the size of the reproduction decreases as the scale of the image increases, there is a maximal acceptable scale such that recognition can be assured. The maximal scale is the "best" scale in terms of computation efficiency. The best scale for prototype group $g_i$, $B(g_i)$, is determined by the equation $$B(g_i) = \underset{j}{\arg\max} \{ S_j(ptt_k) \geq S^{exp}(ptt_k), \; \forall \; ptt_k \in gi \} \quad (7)$$

iv) Determined parameters for successive processing: the parameters may include (a) high level features (as contrast to optical features) not mentioned before, such as compactness, moments, etc., of the prototypes, and (b) the modified values for aforementioned parameters. An example of case (b) is, in an application, the resolution of the image may be 100±10 cm/pixel instead of exactly 100 cm/pixel. The noise of the image can make the reproduction larger or smaller.

Therefore the maximal and minimal size of the targets should be modified to $$S_{i,mod}^{max}(g_j) = (1+\delta) S_i^{max}(g_j) \text{ and } S_{i,mod}^{min}(g_j) = (1-\delta) S_i^{min}(g_j),$$

where $\delta$ is related to the accuracy of the resolution and the noise level. In the following, without confusion, the modified parameters follow the same convention as the original parameters. For example, $S_i^{max}(g_j)$ is in fact $$S_{i,mod}^{max}(g_j).$$

Wavelet transformation is used to down-sample the image to different scales. Because the results of wavelet transformation can also be used in compression, which is a successive operation in many applications, the computational load added would be low. The image is down-sampled up to scale=$\max\{B(g_i) | 1 \leq i \leq N(g)\}$. Thus, in the preferred embodiment, multiple images may be produced at different resolutions (i.e. down-sampled) to be processed later by the present invention. A down-sampled image may require less computation than the original image. For example, a down-sampled image at 1/8th the resolution of the original image may require 1/64 less computations than if performed on the original image.

Generally, objects of a similar size are typically processed from the same down-sampled image. Usually the resolution used for a specific group is the lowest resolution in which all of the prototypes for that group are just detectable (e.g. the minimum size required to distinguish the shape of the prototype). The number of down-sampled images (i.e. levels) preferably varies on the number of different sized objects in the original image.

In the example illustrated in FIG. 1 there are six prototypes. p={textured triangle, textured pentagon, black star, black octagon, white circle, white bar}. These prototypes are classified into four groups as shown in Table 1. In this example, there are two down-sampled images in addition to the original image. The prototypes of group $g_1$ (consisting of the triangle and pentagon) were grouped together because of their common optical feature, texture, and similar size. Likewise, prototype groups $g_2$, $g_3$, and $g_4$ were grouped together because of a common optical feature and similar size. Further processing of prototype groups $g_1$ and $g_3$ in this embodiment will be done using the down-sampled image at scale 1. Likewise, further processing of prototype group $g_4$ will be done using down-sampled image at scale 2, and further processing of prototype group $g_2$ will be done using the original image (i.e. scale=0).

TABLE 1

| Prototype group | $g_1$ | $g_2$ | $g_3$ | $g_4$ |
|---|---|---|---|---|
| Prototypes | Triangle, Pentagon | Star | Octagon | Circle, Bar |
| Feature | texture | black | white | white |
| Scale | 1 | 0 | 1 | 2 |

Figure 2:
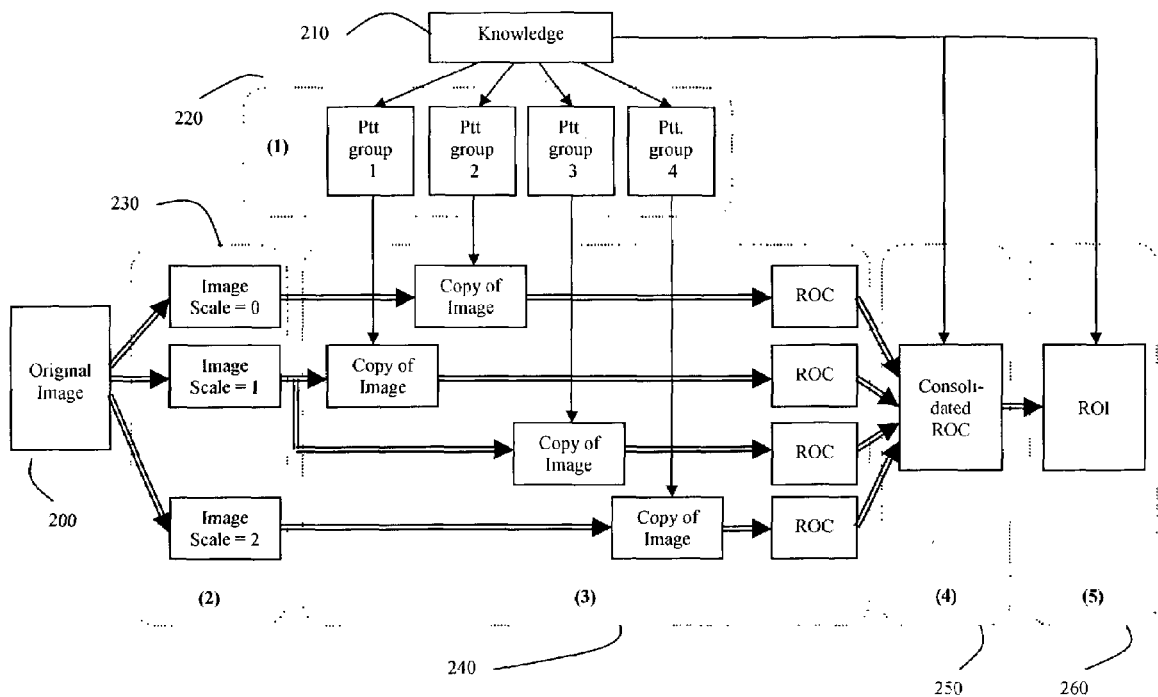
FIG. 2 is a schematic diagram illustrating a method in accordance with the present invention.

The structure of the algorithm used in FIG. 1 is shown in FIG. 2. From knowledge 210, the present invention forms four prototype groups 220. An original image 200 is down-sampled by wavelet transformation to form three multi-resolution images 230.

3. ROC Detection for a Given Prototype Group

The system extracts the optical features that distinguish a prototype group $g_i$. The feature extraction is applied on the down-sampled image at scale $b=B(g_i)$. In the preferred embodiment, as many objects as possible are identified and extracted. The extracted features are dichotomized using thresholding, namely the image will be labeled with "1" for target pixels with the identified features, and "0" for non-target pixels.

The system further examines the connected components with labels of "1". In the preferred embodiment, such connected components are referred to as "regions", and "removing a region" refers to labeling the corresponding pixels to "0". Some of the regions which are labeled with "1" can be removed based on prior information. For example, a thin and long region is unlikely to be a tank that is small and compact.

Figure 3:
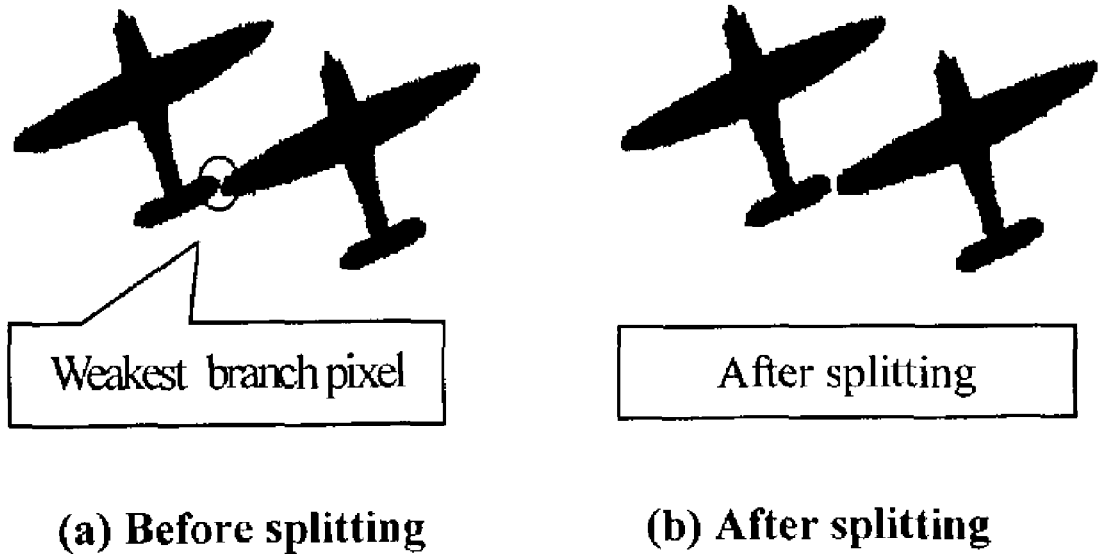
FIGS. 3(a)-(b) shows a splitting function useful in the present invention

For connecting objects, the size of the regions labeled with "1" may exceed $S_b^{max}(g_i)$. In the preferred embodiment, the present invention can split these regions by removing the pixels in the "weakest branch position" until all the sub-regions are equal to or smaller than $S_b^{max}(g_i)$. A branch position/pixel is typically one that has more than two disjoint sets of pixels belonging to the other regions in its neighborhood, and it is weak if the number of pixels belonging to the same region in its neighborhood is small. In the preferred embodiment, to make the split, the weakest branch pixels of one region are removed. FIG. 3 is an example where a region may be split at its weakest branch position. Splitting can be repeated until all regions are not larger than the expected region size for a particular resolution.

In many cases, especially when the quality of the image is poor, the targets are broken into pieces. Therefore, in the preferred embodiment, targets may be merged. The merging process can be done by grouping neighboring regions under the constraints that the resulted new region is smaller than $S_b^{max}(g_i)$ and the new region has a higher probability resembling a prototype. In the preferred embodiment, the merge is a two-step test. First, each region is checked to determine if it can be combined with a neighboring region and not exceed the expected target size for that particular resolution. If two or more regions can be combined in such a manner, the present invention can then determine if the ratio of the length to the total area is in the prescribed range, as determined by the prior knowledge. If so, the regions can be merged and treated as one object.

After merging, if the size of a new region still is smaller than $S_b^{min}(g_i)$, then it is unlikely to be a prototype in $g_i$ and hence can be removed. Therefore the sizes of all the resulted new regions, ROCs, are within $[S_b^{min}(g_i), S_b^{max}(g_i)]$. The detection, splitting and merging steps are illustrated in FIG. 1 and also in FIG. 2 as ROC detection 240.

In the preferred embodiment, edge is taken as the "basic feature." In other words, the preferred embodiment will typically rely on edges when it does not have any specific information of the targets' optical characteristics. To remove noise, prior to edge detection, a Gaussian filter is convolved with the image. In the preferred embodiment, the system then calculates the gradient by using a Sobel operator. In other embodiments, other operators such as Prewitt, Roberts, etc., may also be used. Then the gradient is binarized by thresholding. A threshold typically is predefined manually. However, this threshold is not critical, because a higher threshold, which renders under-segmentation, can be compensated by the merging operation, while a lower threshold will be compensated by the splitting operation.

4. Multi-Voting

An ROC detected under one resolution for a given prototype group $g_i$ is designed to correspond to one prototype in $g_i$. However, it may also correspond to portions or concatenations of prototypes other than those in $g_i$. In other words, one pixel in the image may be occupied by several ROCs for different prototype groups. Therefore, in the present invention, an arbitrator may be used to eliminate redundant regions. The arbitration process may result in a voting procedure using all scales for a series of newly consolidated ROCs. An example of the consolidated ROCs is shown in FIG. 1 and also in FIG. 2 as consolidated ROC 250. In the preferred embodiment, the two voting criteria are: i) no two ROCs should overlap one other; and ii) the total area of the consolidated ROCs should occupy the most number of pixels in the image.

Finding a series of consolidated ROCs is subject to the two criteria i) and ii). It is a non-linear optimization problem. The computation required to find the global optimal solution is prohibitive. Therefore, a simplified algorithm is used to find a local optimal solution. In this algorithm, the ROCs are processed in sequence. An unconsolidated ROC, $roc_0$, is considered a valid ROC only if its pixels are more than the sum of the currently consolidated ROCs, $roc_i$, $1 \leq i \leq N$, that overlap with $roc_0$. After $roc_0$ being declared the newly consolidated ROC, the overlapping ROCs, $roc_i$, $1 \leq i \leq N$, are removed. Small targets are more likely to be concatenated to correspond to a big prototype than a big target to be split into small prototypes. Hence, ROCs corresponding to small prototypes preferably have a higher priority when consolidating. The algorithm used in the preferred embodiment is shown in Table 2.

TABLE 2

An algorithm for multi-voting.

Step 1: Represent all the ROCs in the same resolution. Sort the ROCs in ascending sequence according to the sizes of their corresponding prototypes. Put this sequence in $A_I$. Set $A_O$ to an empty set.
Step 2: Suppose $roc_0$ is the first ROC in $A_I$. Then $roc_0$ corresponds to the smallest prototype in $A_I$. Find out all the ROCs in $A_O$ that overlap with $roc_0$, e.g., $roc_i$, $1 \leq i \leq N$.
Step 3: If the pixels in $roc_0$ are more than the sum of pixels in $roc_i$, $1 \leq i \leq N$, then remove $roc_i$, $1 \leq i \leq N$ from $A_O$ and move $roc_0$ from $A_I$ to $A_O$; otherwise remove $roc_0$ from $A_I$.
Step 4: If $A_I$ is empty, stop the program; otherwise goto step 2.

The consolidated ROCs correspond to the reproductions of all prototypes in this image and are used as "hints" to find the complete targets.

5. ROC Area Extension

Figure 4:
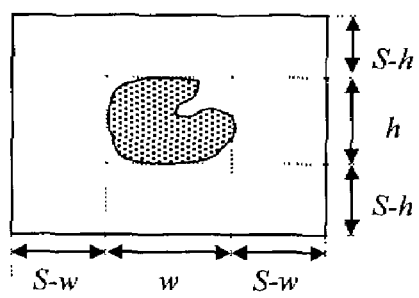
FIGS. 4(a)-(b) shows a membership function useful in the present invention.
Figure 4:
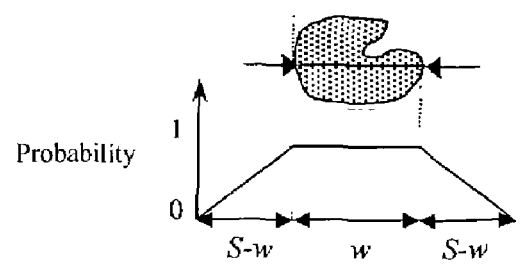

To get the complete targets in the preferred embodiment, the present invention integrates the pixels that are outside of the consolidated ROCs ($roc_i$, $1 \leq i \leq N(roc)$) but that also correspond to the targets. Dilation is not used in the preferred embodiment because it may merge regions from adjacent objects before merging all the pixels in the same object. In the preferred embodiment, a probability-based membership function is used. An example of the membership function is shown in FIG. 4. The size of the smallest rectangle is $S_{rec}$, which contains the roc, with size of w×h (width times height). Also, the maximum dimension of its associating prototype group is S. Therefore, $S \geq w$ and $S \geq h$. By using the size information as existing knowledge, the entire object is assumed to be inside a padded box, $S_{pad}$, which shares the same center as $S_{rec}$. The width and the height of $S_{pad}$ are (2S-w) and (2S-h), respectively. The relationship of $S_{rec}$, $S_{pad}$ and membership can be seen in FIG. 4.

The probability of a pixel located at (x, y) belonging to consolidated $roc_i$ is given by, $$P(x, y) = \begin{cases} 1, & (x, y) \in roc_i \\ \frac{DIS\{(x, y), I - S_{pad}\}}{DIS\{(x, y), I - S_{pad}\} + DIS\{(x, y), roc_i\}}, & (x, y) \in S_{pad} - roc_i \\ 0, & (x, y) \in I - S_{pad} \end{cases} \quad (8)$$

where DIS $\{(x, y), roc_i\}$ is the minimal distance between a pixel at (x, y) and all the pixels in $roc_i$.

A pixel is assigned to the ROC that has the biggest membership value. In the preferred embodiment the newly extended regions from the consolidated ROCs, which also include the ROCs, are referred to as ROIs. To reduce computation, this membership, which is defined on 2-D space, can be approximated by memberships defined on 1-D space.

Figure 5:
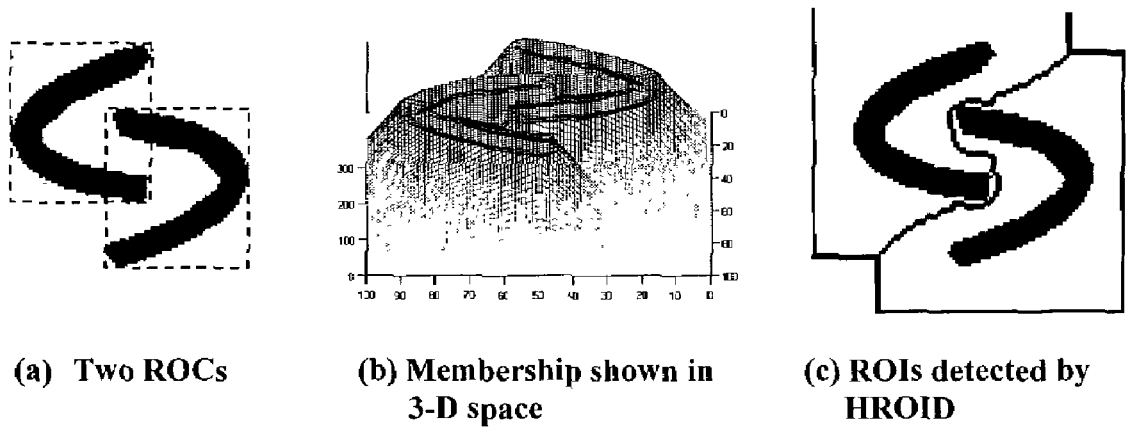
FIGS. 5(a)-(c) shows an area extension function useful in the present invention.
Figure 6A:
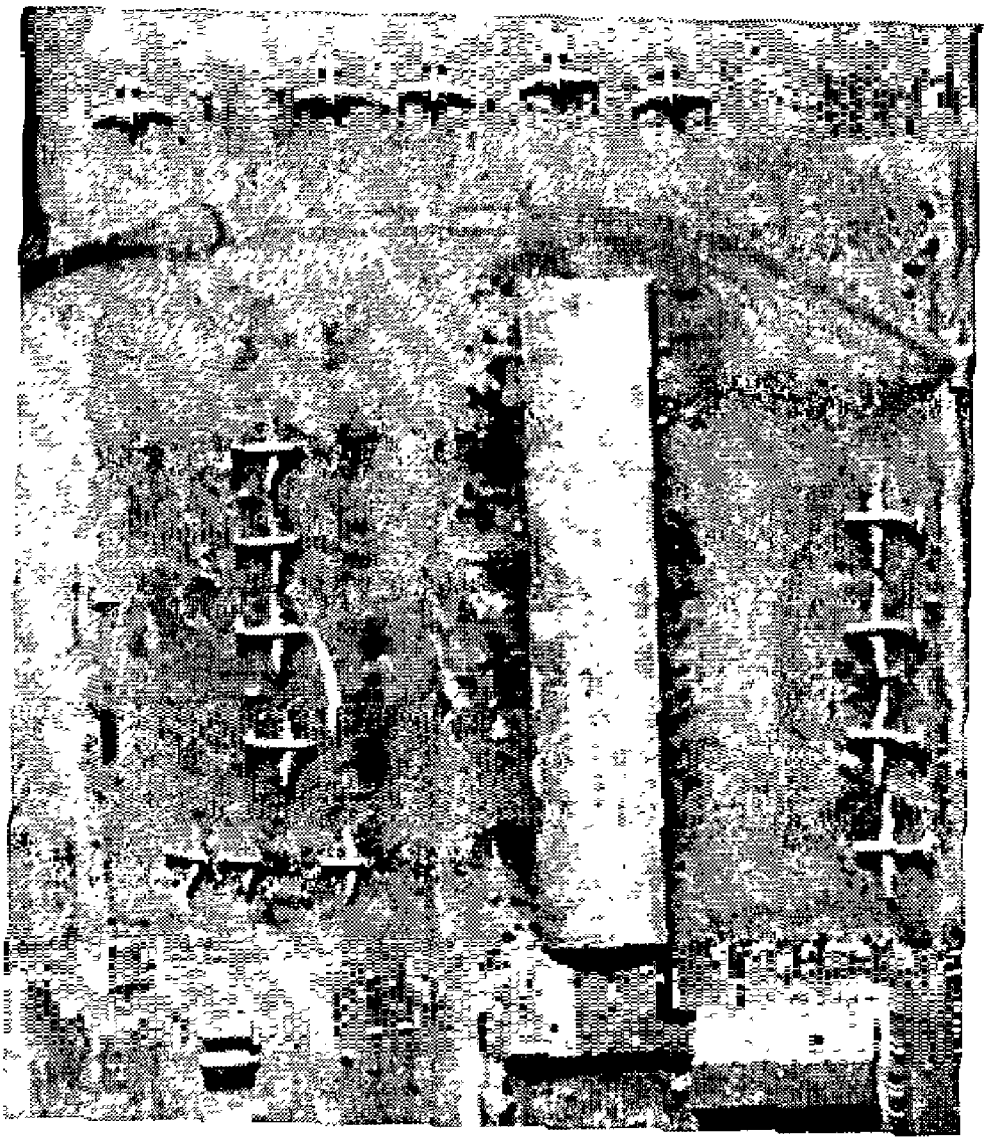
FIGS. 6(a)-(l) shows a series of images illustrating the progressive results using an embodiment of the present invention.
Figure 6B:
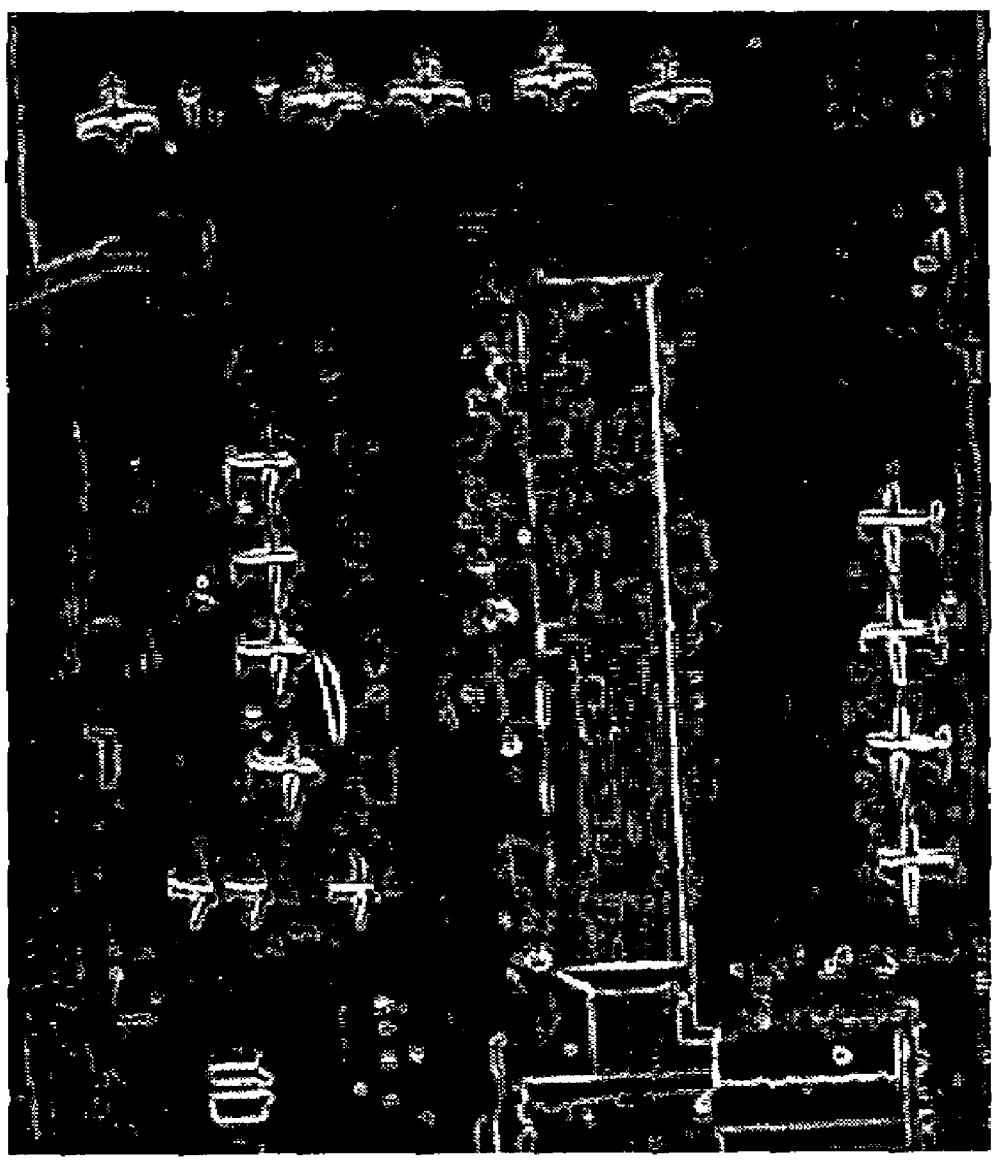
Figure 6C:
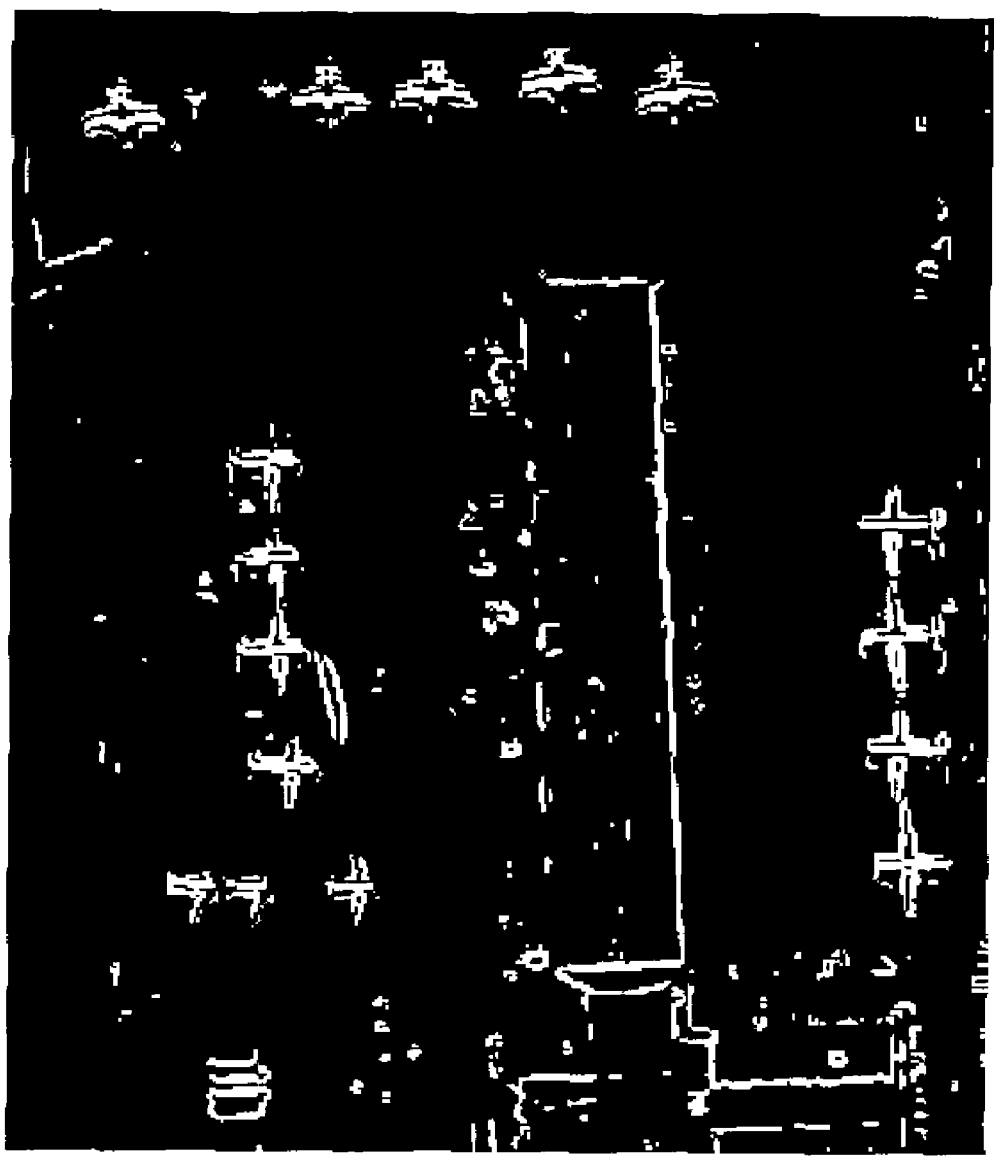
Figure 6D:
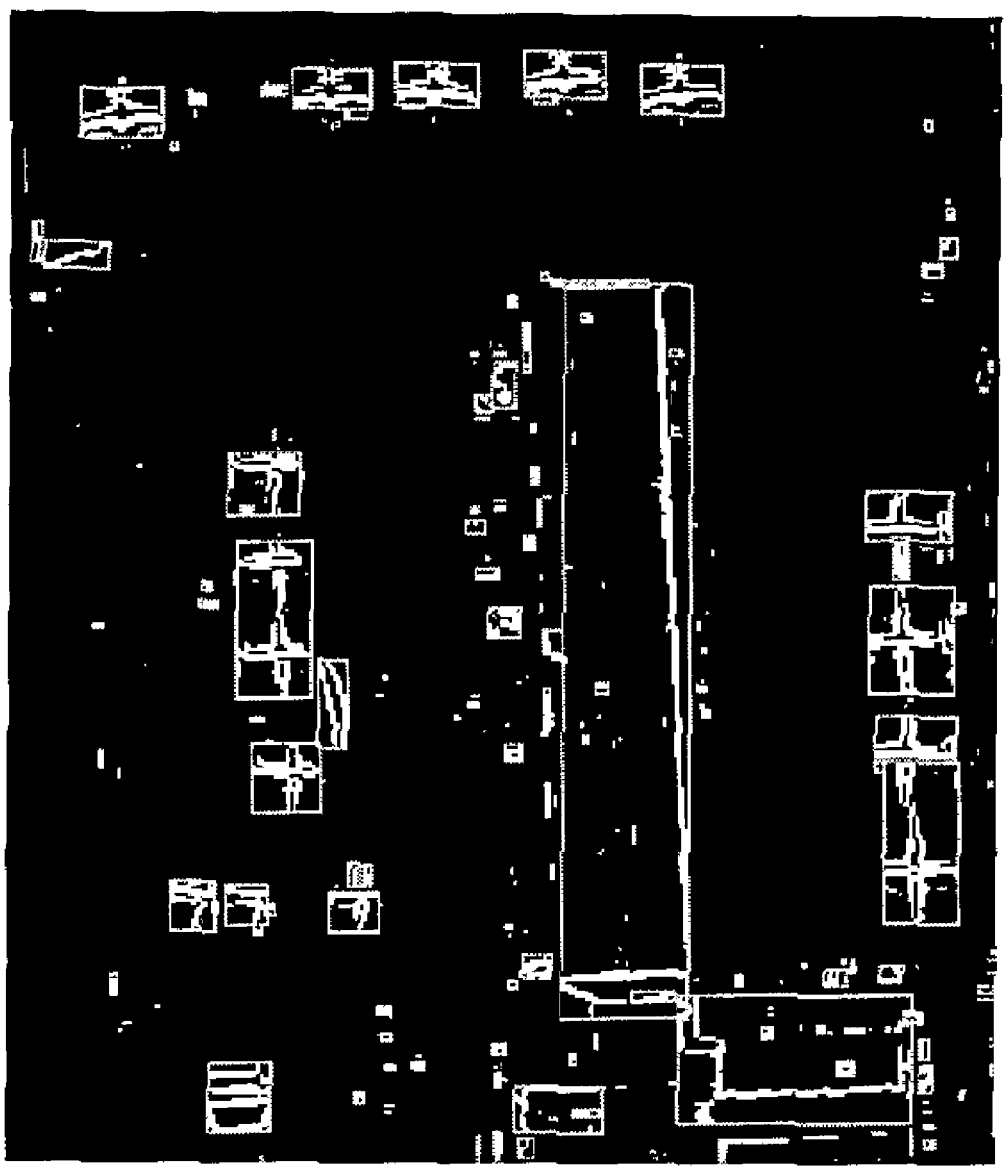
Figure 6E:
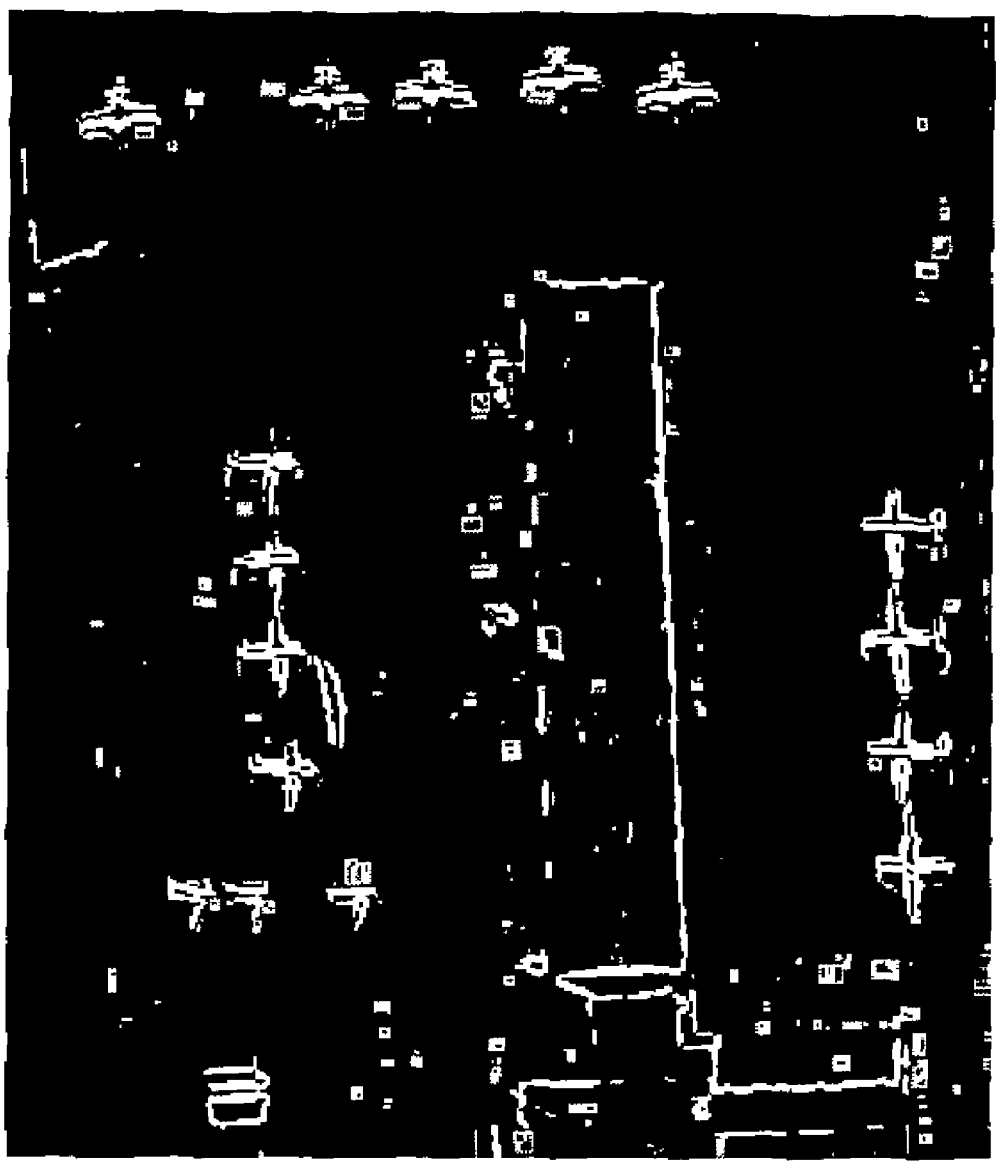
Figure 6F:
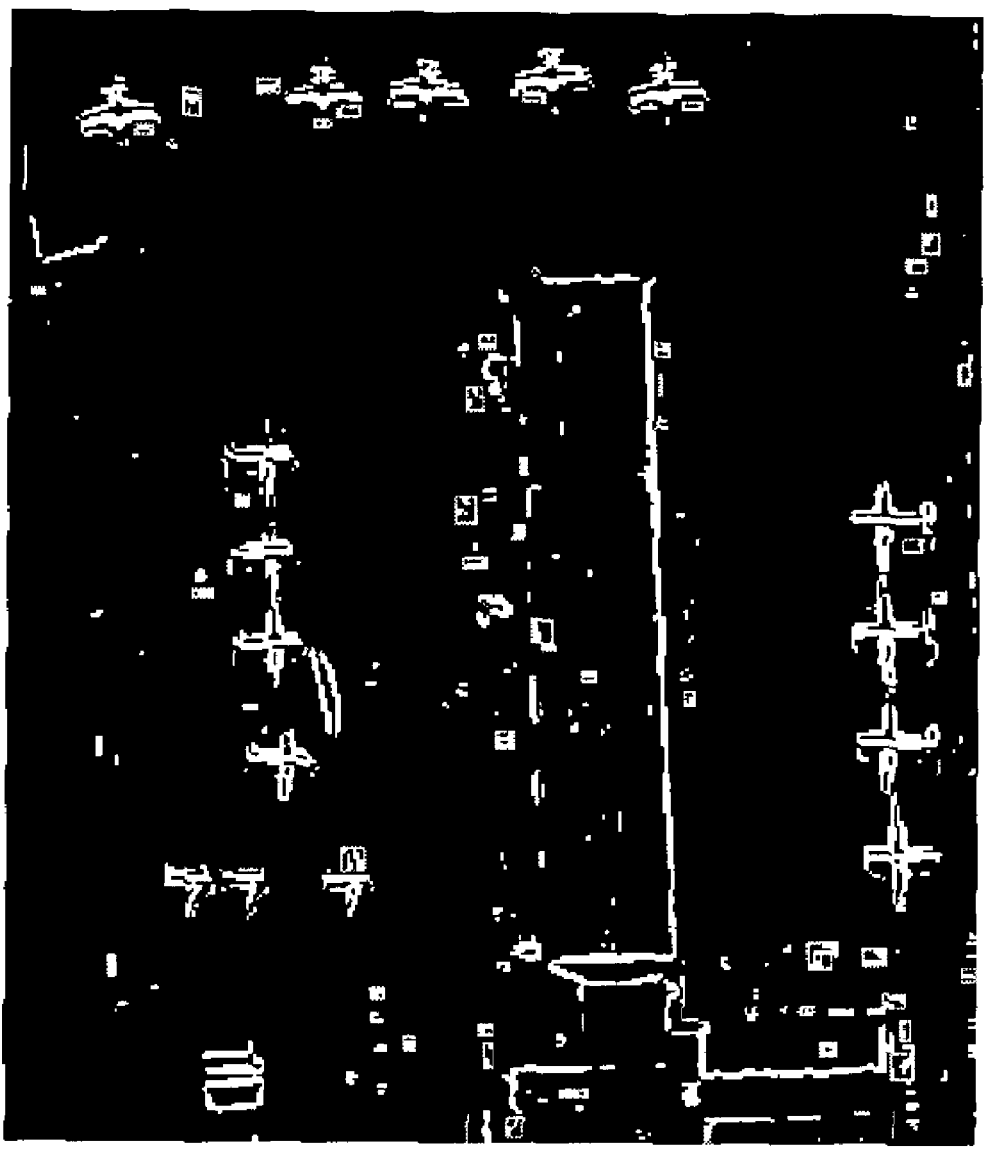
Figure 6G:
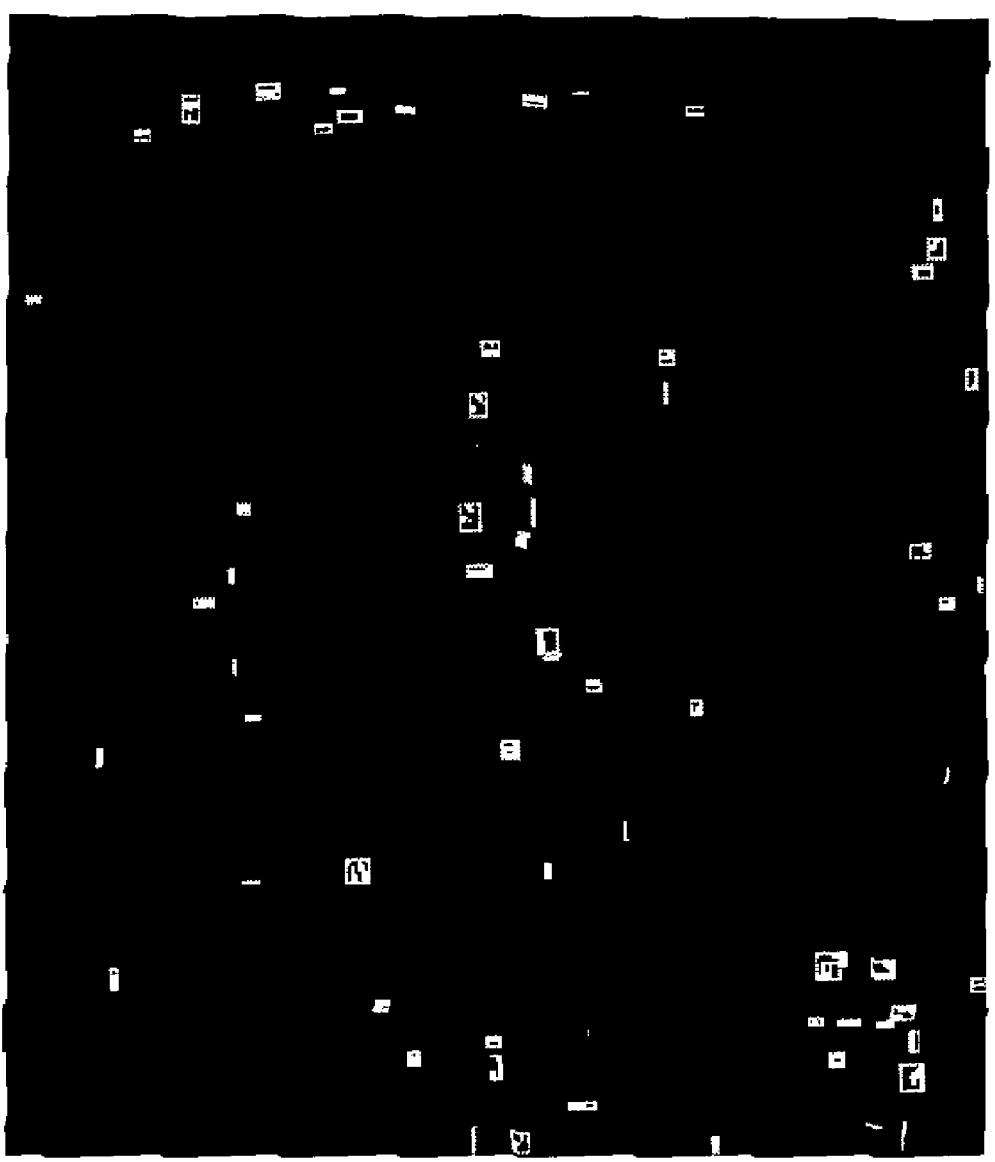
Figure 6H:
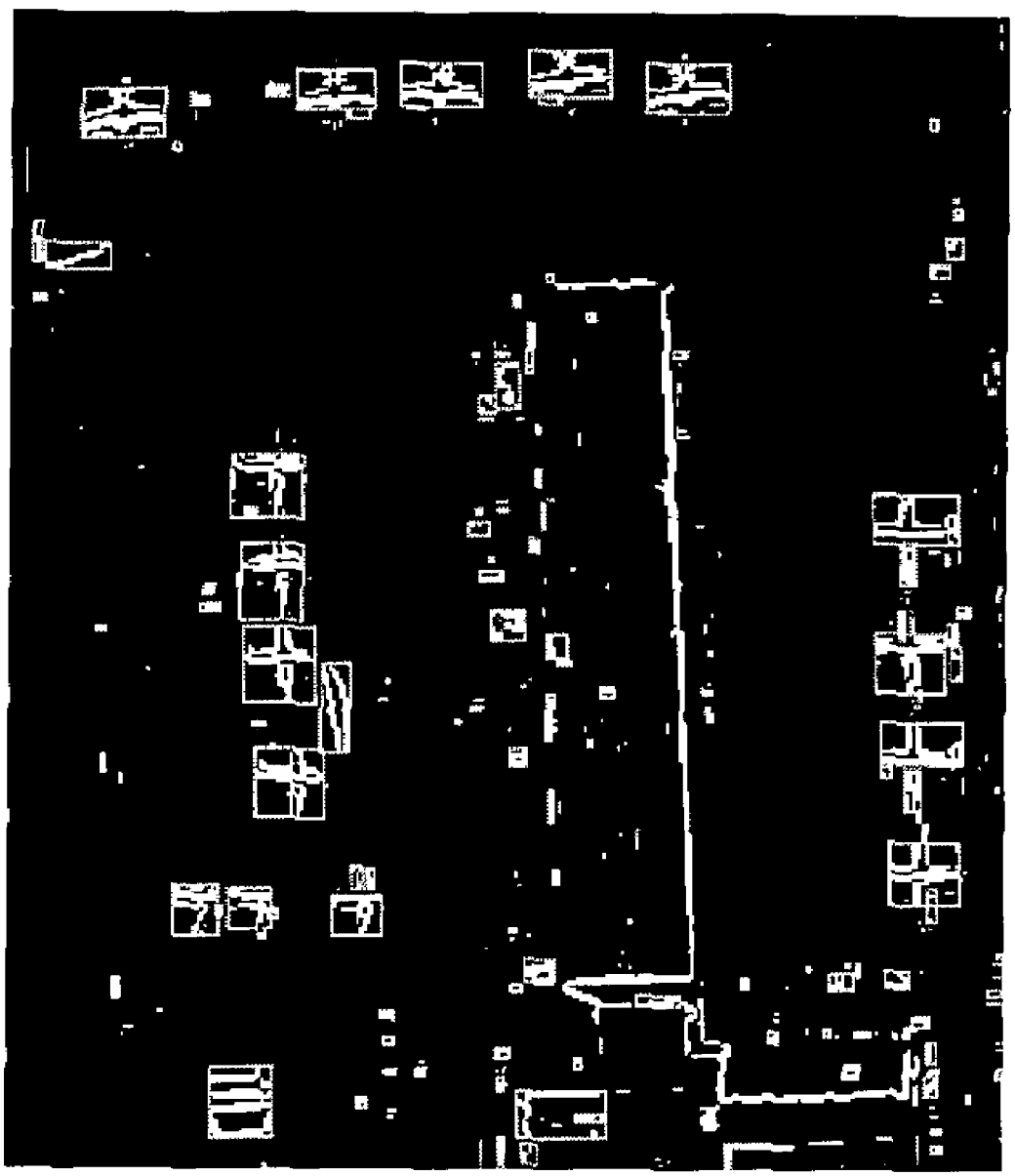
Figure 6I:
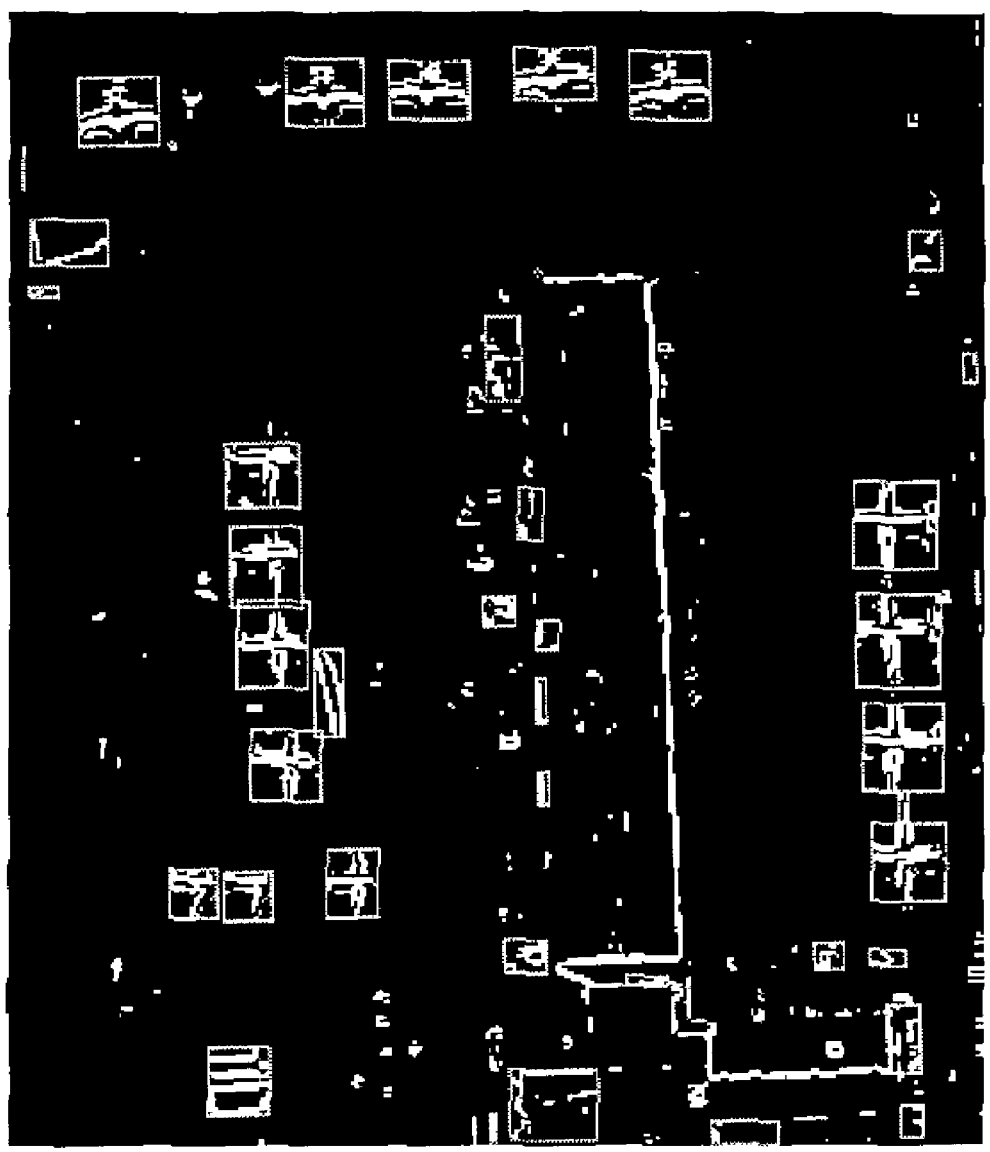
Figure 6J:
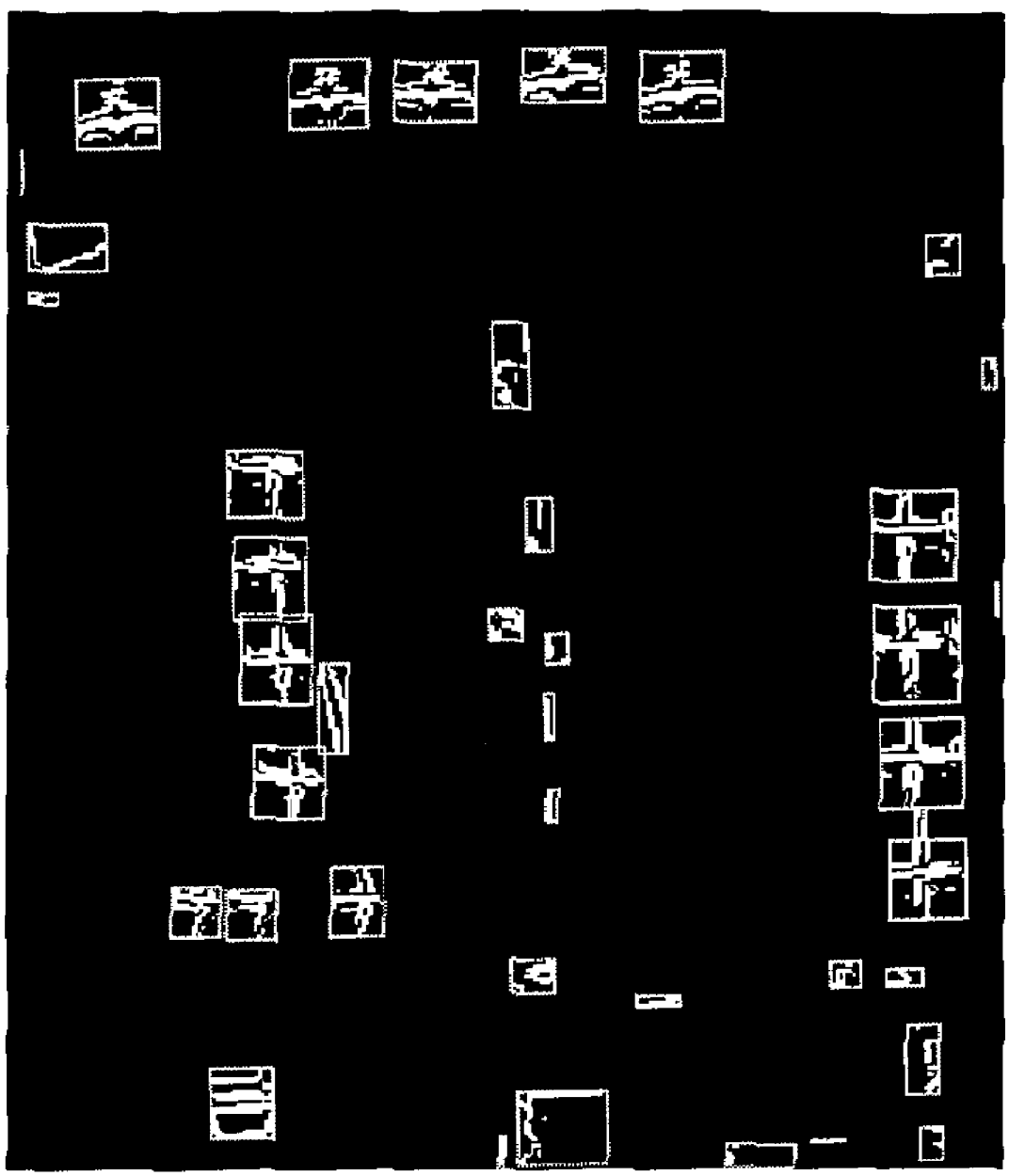
Figure 6K:
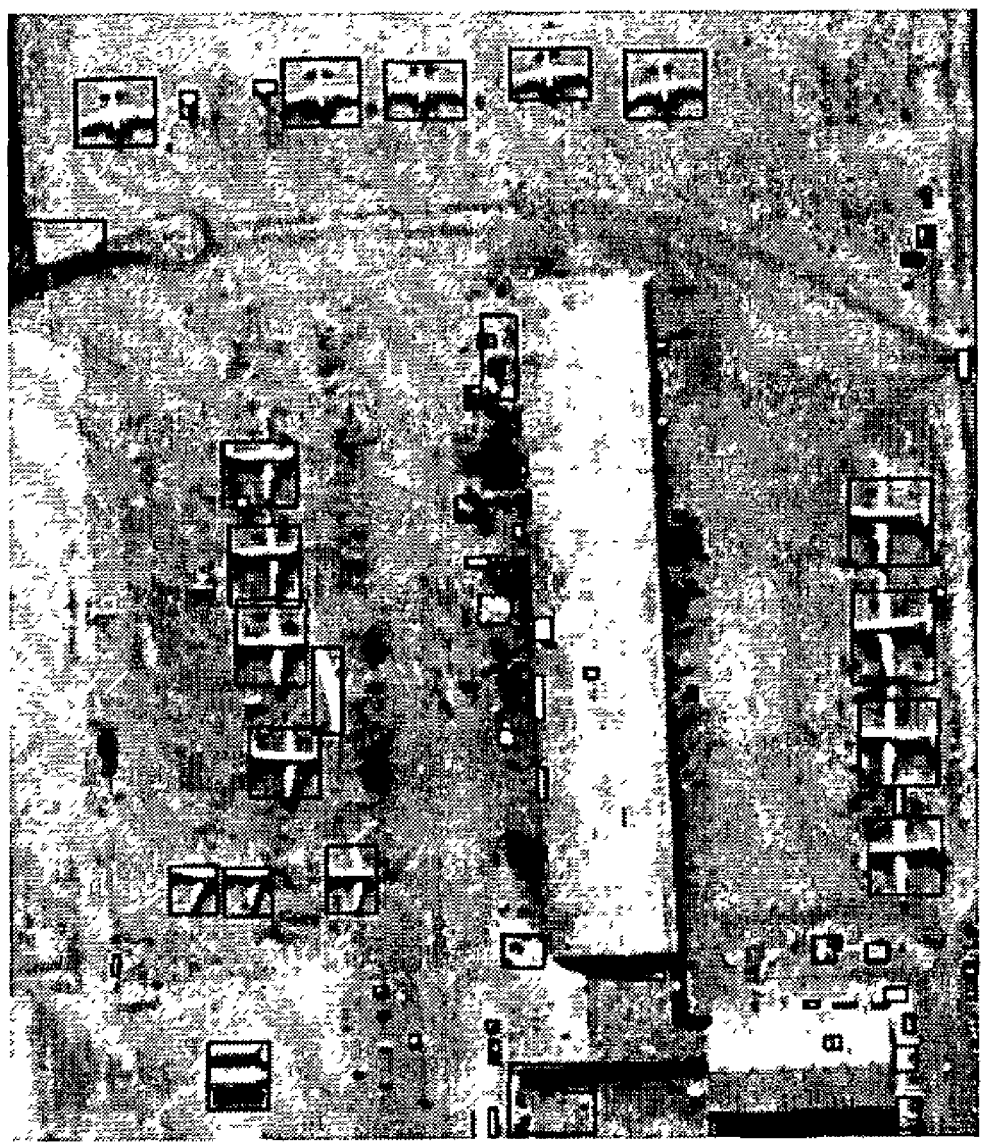
Figure 6L:
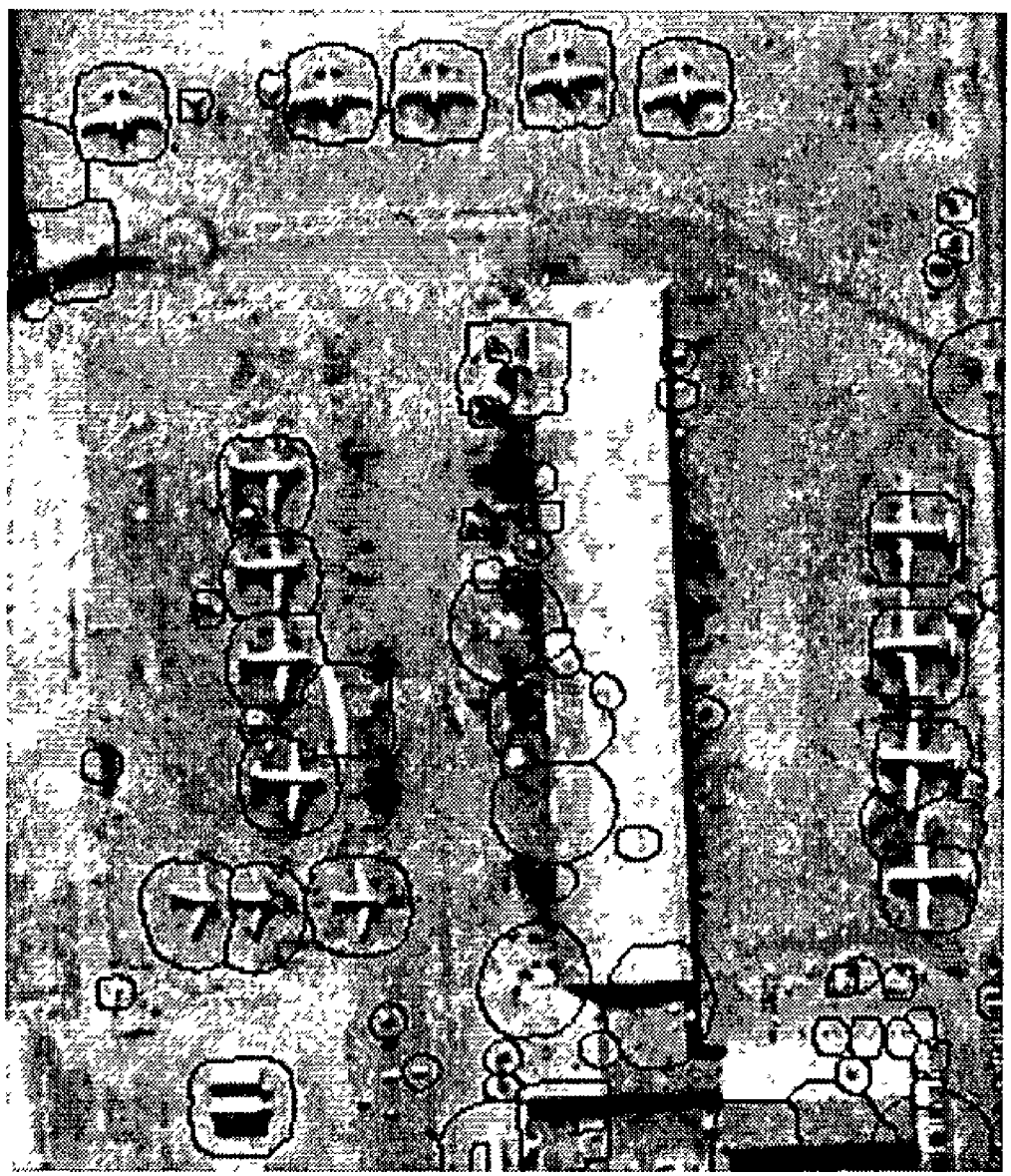

An example of extending two ROCs to two ROIs is shown in FIG. 5. As FIG. 5(a) illustrates, the use of a rectangular box would not provide the best description of this non-rectangular object because expansion may result in overlapping ROIs. The area extension shown in FIGS. 5(b) and 5(c) result in ROIs that are expanded without overlap because they conform more closely to the natural shape of the object.

The present invention may produce several, one, or no ROIs depending on the content of the original image and the prototype information. Each ROI typically has one target and will conform to the shape of that target. Likewise, the target is usually completely enclosed within the ROI. The ROI can then be used further according to the needs of the relevant implementation.

6. Example 1

FIG. 6 illustrates an embodiment of the present invention on an image. In the original image, FIG. 6(a), there are three targets (three prototypes) of interest. All of them are planes, but with different sizes and shapes. These prototypes are divided into two groups. In this example, edge is the optical feature used to distinguish these planes. FIG. 6 is summarized in

TABLE 3

| FIG. | Description |
| --- | --- |
| 6(a) | Original gray image with 8 bit/pixel, and with size of 1216 * 1404. |
| 6(b) | The gradient is quantized to [0, 255] for better visual effect. |
| 6(c) | The thresholded gradient image where white pixels are of interest. |
| 6(d) | The initial regions which are derived from the edge image. Each region is shown in gray bounding box. There are 240 initial regions. |
| Group 1 6(e) | The regions after split. Some regions that are unlikely to correspond to this group of prototypes are eliminated before split. Then the survived regions are split until all the resulted regions are smaller than $S_b^{max}$ ($g_1$). The resulted regions are shown in white and with gray bounding boxes, while the eliminated are shown in white without bounding boxes. |
| 6(f) | The regions after merging. The active regions, whose sizes are within [$S_b^{min}$ ($g_1$), $S_b^{max}$ ($g_1$)], are shown in gray bounding boxes. |
| 6(g) | The regions of candidate. The inactive regions have already been removed. There are 66 ROC for prototype group 1. |

TABLE 3-continued

| FIG. | Description |
| --- | --- |
| Group 2 6(h) | Same as group 1. |
| 6(i) | Same as group 1. |
| 6(j) | Same as group 1. There are 41 ROC for prototype group 2. |
| 6(k) | The consolidated ROCs. There are 82 consolidated ROCs. |
| 6(l) | The regions of interest. |

In an alternative embodiment, feature detection can be accomplished by other optical characteristics such as color or intensity, texture, etc.

In an alternative embodiment, the present invention can be used in various applications where detection of objects is needed especially when the quality of the original image is poor such as infrared images, medical imaging, satellite imaging, etc.

In an alternative embodiment, the present invention may verify and improve the accuracy of ROI detection after performing the split and merge operations before proceeding with further processing by using supervisory information (orthogonal to the characteristics used in feature detection and the split and merge operations). For example, it may be possible to use the "average width" to determine if the ROI contains a certain object, where "average width" is defined as the ratio of the area of the object to the length of the boundary. Alternatively, an embodiment of the present invention can use the ratio of the number of pixels in the target's boundary to the number of pixels inside the target's smallest bounding box.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed:

1. An automated method for detecting a region of interest in an image under consideration containing objects, comprising the steps of:
    dividing prototypes into at least two groups based on prior knowledge;
    generating at least one down-sampled copy of the image under consideration, each said at least one down-sampled copy of the image under consideration having a resolution lower than the resolution of the image under consideration;
    automatically determining at which of said resolutions to detect objects corresponding to prototypes belonging to specific ones of said groups;
    detecting at a first of said resolutions at least a first region containing at least one object from at least one of said groups;
    detecting at a second of said resolutions at least a second region containing at least one object from another of said groups;
    consolidating the plurality of regions; and
    expanding the consolidated region to depict at least one region of interest.

2. The method of claim 1 wherein the expanding step comprises depicting one object in each region of interest.

3. The method of claim 1 further comprising the step of using a feature of said objects to aid in the detecting step.

4. The method of claim 1 wherein the detecting step, the consolidating step, and the expanding step each comprise the step of using prior knowledge.

5. The method of claim 1 wherein the detecting step further comprises the steps of:
   splitting a region in the plurality of regions; and
   merging at least two regions in the plurality of regions.

6. The method of claim 1 wherein the consolidating step comprises the step of using an arbitration process.

7. The method of claim 1 wherein the detecting step comprises the step of performing the detection of an object in a copy of the image under consideration in parallel with the detection of another object in a copy of the image under consideration.

8. The method of claim 1 further comprising the step of using prior knowledge to aid in said detecting step.

9. The method of claim 1 further comprising the step of performing probability assignments on each region of interest to modify the region of interest to conform to the shape of the object.

10. The method of claim 1 further comprising the step of designing a detection algorithm for each group of objects to be used in said detecting step.

11. The method of claim 1 wherein a first down-sampled copy of said image under consideration has a resolution different from a second down-sampled copy of said image under consideration.

12. The method of claim 11 further comprising the step of detecting at a third of said resolutions at least a third region containing at least one object from yet another of said groups.

13. A method for detecting a region of interest in an image under consideration, said method comprising the steps of:
   generating at least one down-sampled copy of said image under consideration, each said at least one down-sampled copy of said image under consideration having a resolution different from the resolution of said image under consideration;
   defining a plurality of prototypes, each said prototypes characterized by at least one characteristic associated with said prototype;
   determining a preferred one of said image under consideration and said at least one down-sampled copy of said image under consideration in which to detect potential objects of interest corresponding to specific ones of said prototypes;
   detecting potential objects of interest in the corresponding preferred one(s) of said image under consideration and said at least one down-sampled copy of said image under consideration;
   defining in each of said image under consideration and said at least one down-sampled copy of said image under consideration in which a potential object of interest was detected a region of candidacy corresponding to each of said potential objects of interest;
   consolidating said regions of candidacy into said image under consideration; and
   defining a region of interest about each of said regions of candidacy.

14. The method of claim 13 further comprising the step of removing unnecessary objects of interest in each down-sampled copy of said image under consideration before performing said step of combining.

15. The method of claim 13 wherein the step of determining is based on said characteristics of said prototypes and information about the sensor that was used to obtain the image under consideration.

16. The method of claim 13 wherein the step of generating comprises the step of using a wavelet transform.

17. The method of claim 13 wherein the step of detecting comprises the step of identifying the potential object of interest by its edge.

18. The method of claim 13 further comprising the step of splitting at least two potential objects of interest after said detecting step.

19. The method of claim 18 further comprising the step of merging a potential object of interest after said splitting step.

20. The method of claim 19 further comprising the step of performing probability assignments on each region of interest to modify the region of interest to conform to the shape of at least one potential object of interest.

21. The method of claim 13 wherein said step of consolidating comprises the step of using a multi-voting algorithm.

22. The method of claim 13 further comprising the step of expanding the region of interest.

23. The method of claim 13 further comprising the step of dividing said prototypes into groups based on said characteristics associated with each of said prototypes and designing an algorithm for detecting potential objects of interest corresponding to each of said groups.

24. The method of claim 13 wherein said step of determining is performed automatically.

25. The method of claim 13 wherein a first down-sampled copy of said image under consideration has a resolution different from a second down-sampled copy of said image under consideration.

* * * * *

UNITED STATES PATENT AND TRADEMARK OFFICE
CERTIFICATE OF CORRECTION

PATENT NO. : 7,231,086 B2
APPLICATION NO. : 10/142175
DATED : June 12, 2007
INVENTOR(S) : Glen P. Abousleman et al.

Page 1 of 1

It is certified that error appears in the above-identified patent and that said Letters Patent is hereby corrected as shown below:

Column 4, line 29, delete "thejth" and insert -- the $j$th --

Column 4, line 30, delete "ith" and insert -- $i$th --

Column 8, line 41, delete "$A_1$." and insert -- $A_1.$ --

Column 8, line 44, delete "$roc_I$," and insert -- $roc_i$,--

Column 8, line 45, delete "$roc_I$," and insert -- $roc_i$,--

Column 8, line 62, delete "roc," and insert -- $roc_i$ --

Signed and Sealed this

Fourth Day of December, 2007

JON W. DUDAS
*Director of the United States Patent and Trademark Office*